Aug. 21, 1945.  G. L. EDWARDS  2,383,178
CONVERTIBLE SEAT STRUCTURE FOR CABIN CRUISERS
Filed Jan. 18, 1944   2 Sheets-Sheet 1
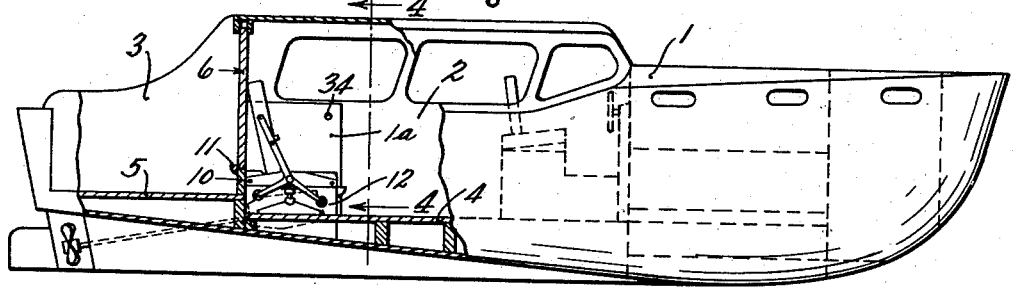
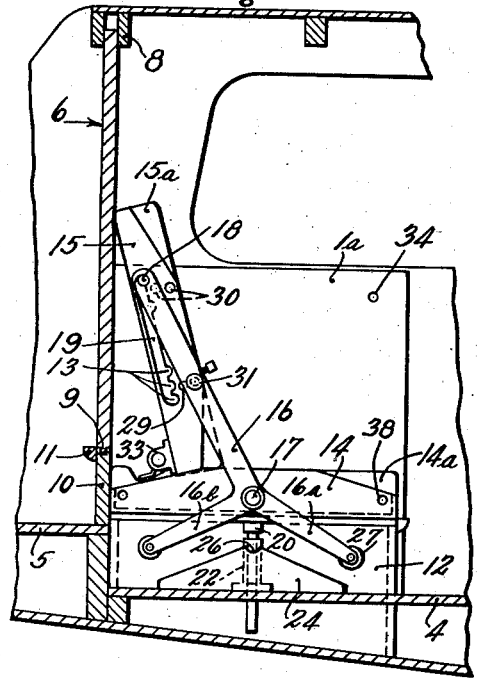
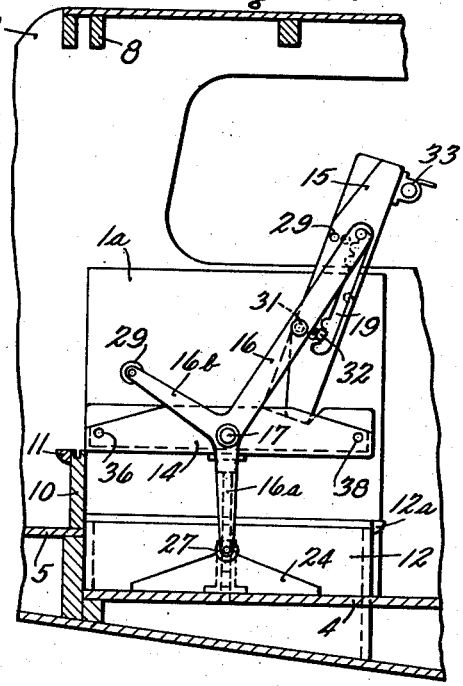
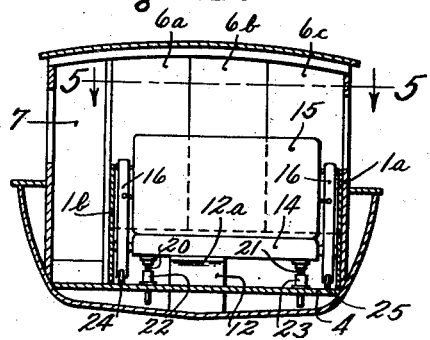
INVENTOR
CHARLES L. EDWARDS
BY Chapin & Neal
ATTORNEYS Aug. 21, 1945.  G. L. EDWARDS  2,383,178
CONVERTIBLE SEAT STRUCTURE FOR CABIN CRUISERS
Filed Jan. 18, 1944  2 Sheets-Sheet 2
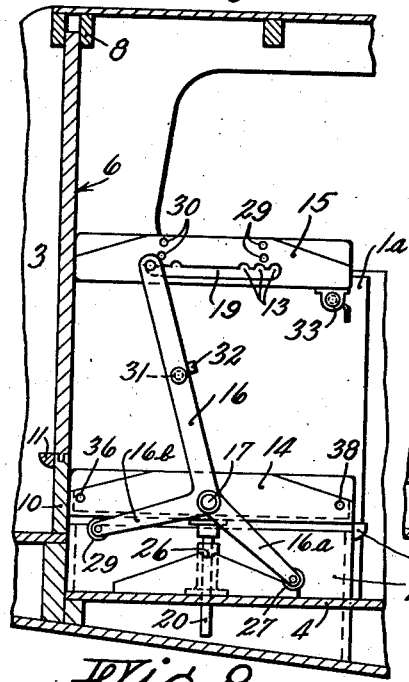
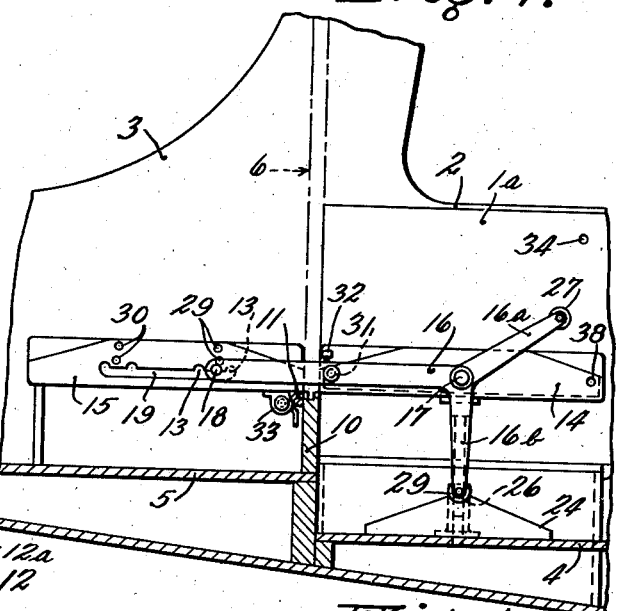
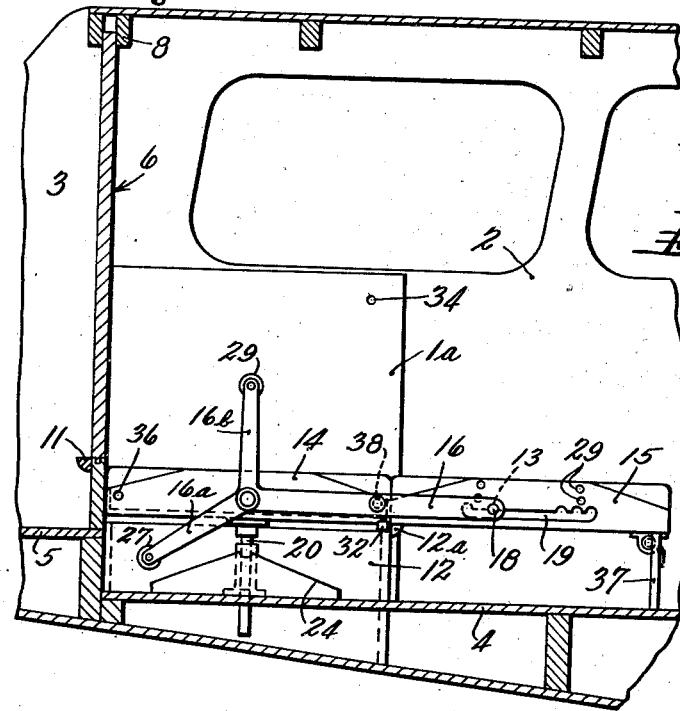
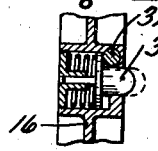
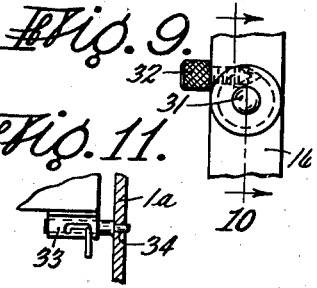
INVENTOR
CHARLES L. EDWARDS
BY Chapin + Neal
ATTORNEYS Patented Aug. 21, 1945

2,383,178

UNITED STATES PATENT OFFICE 2,383,178

CONVERTIBLE SEAT STRUCTURE FOR CABIN CRUISERS

Charles L. Edwards, Springfield, Mass.

Application January 18, 1944, Serial No. 518,719

10 Claims. (Cl. 9—7)

This invention relates to improvements in a convertible seat structure for a dwelling construction and more particularly adapted for use in connection with a cabin or deck house of a boat of the cruiser type. In one aspect the object of the invention is to make possible greater comfort in the living quarters of the relatively restricted space of small boats.

In cabin cruisers of the smaller type, say thirty-six feet overall or under, it is hardly practical to provide the same facilities in living accommodations for an enclosed deck house and for an open cockpit as is available in larger boats. The limitations of space require one or the other to be relatively cramped with respect to adequate comfort and in the freedom to move around. One particular object of my invention therefore is to provide a seat structure for permanent location normally in the deck house and adapted in combination with a removable partition between said deck house and open cockpit, to be convertible so as to furnish a seat or couch for the cockpit without taking up any space in the cockpit. The seat structure may also be converted into a divan for the open cockpit with a minimum use of space therein. The great advantage of the improvement lies in the choice made available to the user of relatively large boat accommodations either in the cockpit or in the deck house as may be desired.

A further object of the invention is to provide means in connection with the convertible seat structure whereby when it is changed over from use in the deck house to use in the cockpit, its general level will be raised so as to have the same height relation to the floor of the cockpit as it previously had to the floor of the deck house, it being understood that in such cabin cruisers, particularly of the smaller type, the deck house floor is at a lower level than the cockpit floor.

A further object of the invention is to provide means whereby the convertible seat structure may be easily changed over into upper and lower berth beds for the deck house or into a double width divan located wholly within the deck house or partly within the deck house and partly within the cockpit. By the removal of the intervening partition between the deck house and cockpit this latter use of my convertible seat structure will provide a double sunbath reclining couch or divan substantially in the open air of the cockpit.

With these foregoing objects in view and some others which will be obvious to those skilled in the art from the description hereinafter, the invention consists in the features, details of construction, combination of parts which will first be described in connection with the accompanying drawings and then more particularly pointed out.

Fig. 1 is a general view of a cabin cruiser, partly broken away to show the locational position of the convertible seat structure therein with respect to the boat as a whole;

Fig. 2 is a sectional detail of the boat at its after part adjacent the cockpit, and showing the convertible seat structure in side view in somewhat more detail than in Fig. 1;

Fig. 3 is a view similar to that in Fig. 2 wherein the intervening partition between the cockpit and deck house has been removed and the seat structure has been converted for use as part of the cockpit accommodations;

Fig. 4 is a transverse section of the boat along line 4—4 of Fig. 1, looking aft and giving a front view of said convertible seat structure;

Fig. 5 is a detail horizontal section through the removable partition along line 5—5 of Fig. 4 and showing the panel construction of said partition;

Fig. 6 is a view similar to that of Fig. 2 showing the convertible seat structure changed over to serve as upper and lower berths in the deck house;

Fig. 7 is a similar view showing the convertible seat structure changed over to form a double divan with its rear half wholly in the cockpit and with the intervening partition removed to enable the forward half of said divan also to serve as part of the accommodations of the cockpit;

Fig. 8 is a similar view to that of Fig. 7 with the intervening partition in place and with the convertible seat structure changed over to form a double divan wholly within the deck house;

Fig. 9 is a front view of a locking device carried by the seat structure lever;

Fig. 10 is a sectional view of the same along line 10—10 of Fig. 9;

Fig. 11 is a detail side view of a bolt latch carried by the back member of the seat structure; and Fig. 12 is a detail of the roller mounted at the end of each of the shorter arms of the seat structure lever.

Referring more particularly to the drawings, the boat or cabin cruiser is indicated generally at 1, and is built with the usual cabin or deck house 2 and open cockpit 3. As will be observed, the floor 4 within the deck house is at a slightly lower level than the floor 5 of the cockpit as is customary with cabin cruisers of this size. At the rear of the deck house and intervening between the same and the cockpit is a removable partition 6 formed with a plurality of separable panels 6a, 6b, and 6c, as shown in Figs. 4 and 5. At the left of said partition, looking aft as in Fig. 4, there is provided door opening 7 between the deck house and the cabin, said opening being closable by a door (not shown).

The means for making panel 6 removable comprise a cross roof beam 8 at the rear end of the cabin formed with a slot into which the upper ends of the panels 6a, 6b, and 6c are slidably fitted in a manner to allow slightly vertical movement of said panels. The lower ends of said panels have a tongue and groove connection 9 with the top edge of a baseboard 10 extending transversely of the boat at the forward end of the cockpit floor. A projecting cleat 11 is provided at the upper rear corner of said baseboard 10, the purpose of which will appear hereinafter.

As shown in Figs. 1 and 4, the motor box or compartment 12 is positioned within the deck house and projects up from the floor thereof centrally of the boat. The motor box 12 serves as a base rest for the seat member 14 of the convertible seat structure when in its lowermost position as shown in Figs. 1, 2, 4, 6, and 8. The seat structure comprises in addition to the seat member 14, a back member 15 which is connected to seat member 14 at each side thereof by a three-armed lever 16. Since the connections between the seat member 14 and back member are the same at both sides, it will suffice to describe one side connection in detail. The lever 16 is pivotally mounted at 17 on said seat member 14 and carries a pin 18 at the outer end of its longest arm engageable in a slot 19 formed in the side wall of said back member 15. The slot 19 is provided with notches 13 for retaining the pin 18 in different adjusted positions. In my preferred construction both the seat member 14 and the back member 15 are formed with a box-like container having metal bottom and sides and ends within which is retained a soft cushion member such as 14a for the seat member and 15a for the back member.

The seat member 14 is guided in a straight line vertical adjustment by two posts 20 and 21, one at each side thereof, slidably fitted in tubular sockets 22 and 23 which are fixed to the floor 4 of the deck house. Also mounted on the deck house floor, one outside of each of said post sockets 22 and 23 are cam track members 24 and 25 each having fore and aft inclined surfaces and a recess seat such as 26 at the apex thereof. The shorter arms 16a and 16b of the connecting lever 16 are arranged to work in conjunction with said cam 24 (it being understood that a similar construction is provided at the other side of the seat member 14) to support the seat member in different vertically adjusted positions as will be described.

The lever 16 and its arms 16a and 16b are arranged to occupy a narrow space between each side of the seat member 14 and an adjacent side wall of the boat indicated at 1a and an adjacent side partition of the boat indicated at 1b, as shown in Fig. 4.

In Fig. 2 the member 14 rests in its lowermost position on the motor box 12. The back member 15 is positioned substantially vertical at the rear of the seat member to provide a backed sofa-like piece of furniture in the deck house facing forwardly. The back member 15 may be adjusted to slightly different inclined positions to the vertical by means of a series of lock holes 29 in the end of the seat member 15 adapted to coact with a lock device 31 (see Figs. 9 and 10) on the lever arm 16. A corresponding series of lock holes 30 are also formed near the opposite end of said seat member side 15 for coaction with said lock device when the back member is turned over and positioned as in Fig. 3.

Referring to Fig. 3, the convertible seat structure has here been changed over from the position shown in Fig. 2 wherein the back faces forwardly to a position where the back faces rearwardly toward the cockpit. In making said seat accessible to the cockpit when in this position the partition 6 is removed as indicated in Fig. 3. Thus an occupant of the boat may utilize the seat structure when shown in the position of Fig. 3 and practically be sitting in the cockpit without using any cockpit space except that necessary for his feet.

It will be observed that in Fig. 3 the seat member 14 and its back member 15 are in elevated position with respect to that shown in Fig. 2 by an amount equal to the difference between floor level 4 and floor level 5. This elevation of the seat structure is accomplished by the action of the lever 16 which brings one of its shorter arms 16a into engagement with the cam 24 until its lower end rests in the recess seat 26 at the apex of said cam. The lower end of said short arm 16a is provided with a roller 27 for working on said cam 24 (see Fig. 12), and when said arm 16a is vertical with its roller in said recess 26 as shown in Fig. 3, the parts will be sufficiently locked against any accidental displacement. Yet the back member may be restored to the position shown in Fig. 2 by a simple push to the rear. The detail construction of the lock device is shown in Figs. 9 and 10 and comprises a spring pressed stud 31 normally tending to enter one of the holes 29 or 30. A thumb screw 32 with a conical end for retracting said pin serves to limit the forward movement thereof into its hole. When the screw 32 is screwed home in the position shown in Fig. 10, the pin 31 only partly enters hole 29 and is easily disengageable therefrom by reason of its rounded end. When the screw 32 is turned to an outer position, the pin 31 may then enter fully into its hole 29 and securely lock the arm in the position so adjusted.

Referring to Fig. 6, the seat structure in this view has been adjusted to form upper and lower berths, the seat member 14 serving as the lower berth and the back member 15 as the upper berth. A secure support is provided for the upper berth 15 by means of the lever arm 16 positioned as shown and by means of a bolt latch 33 carried by each forward corner of said back member 15 and adapted to engage into a socket such as 34 formed in the adjacent side wall 1a, and short side partition 1b of the boat (see Figs. 4 and 11). In this position of the structure the rear partition 6 can be left in place or removed, and if desirable screens can be used in place of wall 6.

Referring to Fig. 7 the convertible seat structure has here been changed to provide a divan one-half of which is located in the deck house and half of which is in the cockpit. In this position the intervening partition 6 may either be in use or removed as indicated by the dotted lines in said Fig. 7. If the rear partition 6 is left in place sofa cushions may be piled against the same at each side to provide separate divans, one in the deck house 2 and one in the cockpit 3. The seat member 14 in this position is preferably elevated to the same amount as shown in Fig. 3. It is supported in this raised position by the short arm 16b of the lever 16, said arm 16b carrying at its end a roller 29 working on the cam 24 and adapted to seat in the recess seat 26 of the said cam. The back member 15 in its cockpit location rests with its forward end upon the cleat 11 heretofore described on the baseboard 10. The rear end of said back member 15 is supported by foldable legs which are connected to the back member 15 by concealed hinge (not shown). To prevent any shift of roller 29 out of recess 26, or separation of the members 14 and 15, the long arm 16 of said lever is locked by means of the locking device 31 into a hole 36 at the rear end of the seat member 14 (see Fig. 6). The pin 18 in the outer end of the arm 16 will fit into one of the notches 13 of the slot 19 and thus securely hold the seat member and back member in aligned horizontal position as a double divan. If it is desired to bring the horizontal members 14 and 15 closer together, the member 15 may be shifted slightly forward, in which position the pin 18 will lock in a rearward notch 13 of the cam slot 19.

Referring to Fig. 8, the convertible seat structure has been here changed over to form a double divan wholly within the deck house. The seat member 14 rests upon the motor box 12 and the forward end of the back member 15 is supported on a foldable leg 37 which is connected by a concealed hinge (not shown) to the interior of said back member. The lock 31 on the lever arm 16 will here be engaged in the hole 38 at the forward end of said seat member, and the pin 18 of lever 16 will engage a notch 13 of cam slot 19, so as to hold the members 14 and 15 in locked end to end relation. A support for the rear end of said member 15 is provided by a bead 12a formed at the upper front corner of the motor box 12.

It is to be understood that the present detailed disclosure of my invention is for the purpose of illustrating one of its suitable applications, and that it may be embodied in many other forms than the one shown. There are many other arrangements of a closed cabin or deck house with adjacent open air seating area, than the one herein shown, to which my improvement may be equally well adapted. In the form of a self-contained unit my improvement may also be employed as a part or equipment for many types of houses and other dwellings. The full scope of my invention is set forth in the appended claims.

The term "deck house" as herein used is to be interpreted as meaning any enclosed living quarters on a boat and by the term cockpit is meant any open living space adjacent said enclosed quarters.

I claim:

1. The combination with a cabin cruiser having a deck house and cockpit with the floor of the deck house at a lower level than the floor of the cockpit, and a removable partition between said deck house and cockpit, of a convertible seat structure adjacent said partition and comprising a seat member at the forward side of said partition and a back member, means connecting said seat member and back member constructed and arranged to control an adjusting movement of said back member into different positions, one adjusted position being with said back member substantially vertically disposed at the rear end of said seat member and another adjusted position with said back member substantially vertically disposed at the front end of said seat member, and means acting in conjunction with said connecting means when said back member is moved to said latter position to elevate the seat member and back member by an amount approximately equal to the difference in level between said deck house floor and said cockpit floor.

2. The combination with a cabin cruiser having a deck house and cockpit with the floor of the deck house at a lower level than the floor of the cockpit, and a removable partition between said deck house and cockpit, of a convertible seat structure adjacent said partition and comprising a seat member at the forward side of said partition and a back member, means connecting said seat member and back member constructed and arranged to control an adjusting movement of said back member into different positions, one adjusted position being with said back member substantially vertically disposed at the rear end of said seat member and another position with said back member substantially horizontally disposed at the rear end of said seat member, and means acting in conjunction with said connecting means when said back member is moved to said latter position to elevate the seat member by an amount approximately equal to the difference in level between said deck house floor and said cockpit floor, and means for supporting the rear end of said back member from the floor of said cockpit.

3. The combination with a cabin cruiser having a deck house and cockpit with the floor of the deck house at a lower level than the floor of the cockpit, and a removable partition between said deck house and cockpit, of a convertible seat structure adjacent said partition and comprising a seat member at the forward side of said partition and a back member, means connecting said seat member and back member constructed and arranged to control an adjusting movement of said back member into different positions, one adjusted position being with said back member substantially vertically disposed at the rear end of said seat member and another position with said back member substantially horizontally disposed at the rear end of said seat member, and means acting in conjunction with said connecting means when said back member is moved to said latter position to elevate the seat member by an amount approximately equal to the difference in level between said deck house floor and said cockpit floor, and means carried by said back member for supporting the rear end of said back member from the floor of said cockpit, and means for locking said seat member and back member against longitudinal movement with respect to one another when said back member is in horizontal position.

4. The combination with a cabin cruiser having a deck house and cockpit with the floor of the deck house at a lower level than the floor of the cockpit, and a removable partition between said deck house and cockpit, of a convertible seat structure adjacent said partition and comprising a seat member at the forward side of said partition and a back member, means connecting said seat member and back member constructed and arranged to control an adjusting movement of said back member into different positions, one adjusted position being with said back member substantially vertically disposed at the rear end of said seat member and another adjusted position with said back member substantially vertically disposed at the front end of said seat member, and means acting in conjunction with said connecting means when said back member is moved to said latter position to elevate the seat member and back member by an amount approximately equal to the difference in level between said deck house floor and said cockpit floor, said connecting means comprising a lever pivotally carried on said seat member with one arm connected to said back member and another arm arranged to coact with a cam member fixed to the floor of said deck house.

5. The combination with a cabin cruiser having a deck house and cockpit with the floor of the deck house at a lower level than the floor of the cockpit, and a removable partition between said deck house and cockpit, of a convertible seat structure adjacent said partition and comprising a seat member at the forward side of said partition and a back member, means connecting said seat member and back member constructed and arranged to control an adjusting movement of said back member into different positions, one adjusted position being with said back member substantially vertically disposed at the rear end of said seat member, a second adjusted position with said back member substantially vertically disposed at the front end of said seat member and a third adjusted position with the back member substantially horizontally disposed at the rear end of said seat member and means acting in conjunction with said connecting means when said back member is moved to said second and third positions to elevate the said seat member by an amount approximately equal to the difference in level in said deck house floor and said cockpit floor, said connecting means comprising a three arm lever pivotally carried on said seat member with one arm connected to said back member and the other two arms arranged to coact with a cam member fixed to the floor of said deck house.

6. A convertible seat structure comprising a seat member and a back member, a stationary cam holder located below said seat member and connecting means between said seat member and back member constructed and arranged to control an adjustment of said back member into different positions, one adjusted position being with said back member substantially vertically disposed at the rear of said seat member, another adjusted position being with said back member substantially vertically disposed at the front of said seat member, and another adjusted position being with said back member substantially horizontally disposed at either the front or the rear of said seat member, said connecting means comprising a three armed lever pivotally carried on said seat member with one arm connected to said back member and the other two arms arranged for selective coaction with said stationary cam member when said back member is being moved into said different adjusted positions.

7. In combination with a cabin cruiser having a deck house floor at a different level than the floor of the cockpit, and a removable partition between said deck house and cockpit, of a convertible seat structure adjacent said partition and comprising a seat member at the forward side of said partition and a back member, means connecting said seat member and back member constructed and arranged to control an adjusting movement of said back member into different positions, one adjusted position being with said back member substantially vertically disposed at the rear end of said seat member and another adjusted position with said back member substantially vertically disposed at the front end of said seat member, and supporting means to change the height of said seat member and back member by an amount approximately equal to the difference in level between said deck house floor and said cockpit floor.

8. In combination with a cabin cruiser having a deck house floor at a different level than the floor of the cockpit, and a removable partition between said deck house and cockpit, of a convertible seat structure adjacent said partition and comprising a seat member at the forward side of said partition and a back member, means connecting said seat member and back member constructed and arranged to control an adjusting movement of said back member into different positions, one adjusted position being with said back member substantially vertically disposed at the rear end of said seat member and another adjusted position with said back member substantially vertically disposed at the front end of said seat member, and means acting in conjunction with said connecting means when said back member is moved to said latter position to change the height of said seat member and back member by an amount approximately equal to the difference in level between said deck house floor and said cockpit floor.

9. The combination with a cabin cruiser having a deck house and cockpit with the floor of the deck house at a different level than the floor of the cockpit, and a removable partition between said deck house and cockpit, of a convertible seat structure adjacent said partition and comprising a seat member at the forward side of said partition and a back member, means connecting said seat member and back member constructed and arranged to control an adjusting movement of said back member into different positions, one adjusted position being with said back member substantially vertically disposed at the rear end of said seat member and another position with said back member substantially horizontally disposed at the rear end of said seat member, and supporting means to change the height of the seat member by an amount approximately equal to the difference in level between said deck house floor and said cockpit floor, and means for supporting the rear end of said back member from the floor of said cockpit.

10. The combination with a cabin cruiser having a deck house and cockpit with the floor of the deck house at a different level than the floor of the cockpit, and a removable partition between said deck house and cockpit, of a seat structure adjacent said partition and means to support said seat structure at different heights for serving either of said floors.

CHARLES L. EDWARDS.